United States Patent [19]

Bosch et al.

[11] Patent Number: 5,640,008
[45] Date of Patent: Jun. 17, 1997

[54] MEASURING DEVICE FOR DETERMINING THE DISPLACEMENT OF A MOVABLE OBJECT

[75] Inventors: Johannes W. D. Bosch; Josephus J. M. Braat; Joannes G. Bremer, all of Eindhoven, Netherlands

[73] Assignee: U.S. Philips Corporation, New York, N.Y.

[21] Appl. No.: 304,002

[22] Filed: Sep. 9, 1994

[30] Foreign Application Priority Data

Sep. 13, 1993 [BE] Belgium ................... 09300957

[51] Int. Cl.⁶ .................... H01J 3/14; H01J 5/16
[52] U.S. Cl. .................... 250/237 G; 250/559.4; 356/373; 33/707
[58] Field of Search .................. 250/237 G, 559.4; 356/373, 374, 375; 33/707

[56] References Cited

U.S. PATENT DOCUMENTS

| | | |
|---|---|---|
| 3,589,235 | 6/1971 | Rogers . |
| 3,973,119 | 8/1976 | Renes et al. . |
| 4,340,814 | 7/1982 | DiCiaccio . |
| 4,597,665 | 7/1986 | Galbraith . |
| 5,309,276 | 5/1994 | Rodgers . |

FOREIGN PATENT DOCUMENTS

| | | |
|---|---|---|
| 0503716 | 9/1992 | European Pat. Off. . |
| 2002891 | 7/1971 | Germany . |
| 9006491 | 11/1991 | Germany . |

*Primary Examiner*—Stephone Allen
*Attorney, Agent, or Firm*—Bernard Franzblau

[57] ABSTRACT

A measuring device for determining the displacement of a movable object includes a graduation element which is mechanically connected to the object whose displacement is to be determined. The graduation element comprises at least a track which is formed by a plurality of successive grating strips located transversely to the direction of movement of the object. The measuring device also includes a radiation source, a detector and a reflective optical system which comprises at least a beam collimating element. The reflective optical system guides the radiation from the radiation source to the graduation element and changes it to an elongate radiation beam which is parallel on average in the cross-section perpendicular to the grating strips.

20 Claims, 3 Drawing Sheets

MEASURING DEVICE FOR DETERMINING THE DISPLACEMENT OF A MOVABLE OBJECT

BACKGROUND OF THE INVENTION

1. Field of the Invention

This invention relates to a measuring device for determining the displacement of a movable object in cooperation with a graduation element connected to the object and having at least a track which is formed from a plurality of successive grating strips extending transversely to the direction of movement of the object, said measuring device comprising at least a radiation source for generating radiation and an associated optical system for converting the radiation into a radiation beam which is parallel on average and for guiding this radiation beam towards the graduation element, and a radiation-sensitive detection system for converting radiation from the graduation element into an electric signal.

2. Description of the Prior Art

Patent measuring device of the type described in the opening paragraph is known from U.S. Pat. No. 3,973,119. In the measuring device described in this Patent a grating mechanically connected to the object is projected via a multiple photocell detector. This detector comprises a row of strip-shaped, substantially identical photosensitive cells which are consecutively connected by means of an electric switch to an electric circuit which processes the signal generated in the photosensitive cells. The electric switch can ensure that the detector may serve as a reference grating. The grating is preferably imaged 1:1 on the photosensitive cell array. To introduce a minimum number of read errors in such an image due to oblique projection of the grating strips on the detector, the radiation from the radiation source is to be converted into a scanning beam which is parallel in the cross-section perpendicular to the grating strips. Parallelism is not required in the cross-section parallel to the grating strips.

In the measuring device described in said United States Patent, the radiation from the radiation source is guided towards a collimator lens via a partially transparent mirror. The parallel scanning beam formed by the collimator lens is subsequently incident on the graduation element. After reflection on the graduation element, the beam travels to the partially transparent mirror via the collimator lens so that the beam is reflected towards the detector.

The known measuring device has the drawback that the optical system for generating a parallel scanning beam is a combination of standard lenses and mirrors and consequently occupies a relatively large space. A further drawback is the low light output. The partially transparent mirror only passes approximately half the radiation incident thereon, so that only approximately a quarter of the radiation emitted by the radiation source reaches the detector.

SUMMARY OF THE INVENTION

It is an object of the invention to provide a measuring device for determining the displacement of a movable object, which device is more compact and at the same time provides a scanning beam which, in principle, has a larger power and at least the same degree of parallelism.

The measuring device according to the invention is therefore characterized in that the optical system is a reflective optical system and comprises at least a collimating element.

By implementing the optical system with reflecting elements, the required optical path length between the radiation source and the graduation element can be realized within a smaller dimension of the measuring device. Consequently, a relatively compact measuring device is obtained. The collimating element for converting the radiation of the radiation source into a parallel scanning beam forms a part of the reflective optical system.

An embodiment of the measuring device according to the invention is characterized in that the collimating element is an off-axis portion of a rotationally symmetrical rotational paraboloid, with the radiation source being arranged at its focus. A paraboloid has an axis around which the paraboloid is rotationally symmetrical. This axis intersects the paraboloid at the center point thereof. An off-axis portion of the paraboloid is any portion thereof that does not include the center point.

A very suitable collimating element for use in the present invention is an off-axis portion of a rotationally symmetrical rotational paraboloid. Radiation incident on a rotationally symmetrical rotational paraboloid, which radiation comes from the focus of the paraboloid, will be reflected by the paraboloid as a parallel radiation beam. In order that a parallel radiation beam is generated which can be directly incident on the graduation element without having to arrange partially reflecting beam-splitting elements in the light path, use is made of an off-axis portion.

In principle, a light-emitting diode (LED) or a semiconductor laser may be used as a radiation source. A semiconductor laser has the advantage that the radiation beam has a relatively small divergence, but the lifetime is relatively short as compared with that of a LED. Consequently, a LED is preferred because of its longer lifetime. However, since a LED emits radiation in all directions, it is important to utilize the radiation emitted by the LED as efficiently as possible and to guide as much radiation as possible towards the detector. To this end a preferred embodiment of the measuring device according to the invention is characterized in that the collimating element is a parabolically cylindrical mirror whose cylindrical axis is parallel to a plane constituted by a grating strip and the normal on the graduation element and whose cross-section perpendicular to said plane is parabolic, and in that the optical system further comprises, between this mirror and the radiation source, an elliptically cylindrical mirror whose cylindrical axis is perpendicular to the grating strips and whose cross-section in a plane parallel to the grating strips is elliptic.

A further embodiment of the measuring device according to the invention is characterized in that the optical system further comprises at least a flat folding mirror.

By associating one or more flat folding mirrors with the optical system, the light path can be folded to a further extent, which contributes to the compactness of the measuring device. Such a mirror can be arranged at different positions in the light path between the radiation source and the graduation element.

A further embodiment of the measuring device according to the invention is characterized in that the radiation source and the detection system are present in a housing and the elements of the reflective optical system are incorporated in the walls of the housing.

The housing may be obtained, for example, by means of injection moulding and provided with windows which can be given the desired shape. Since the optical system consists of reflecting elements, it is sufficient to provide a layer of reflecting material on the windows along the inner or outer wall of the housing so as to obtain the desired optical component. Moreover, the reflective optical components are integrated in this way in the housing which also accommodates the radiation source and the detector so that a compact measuring device is obtained.

All of the above-mentioned embodiments of the measuring device according to the invention may be further characterized in that at least the collimating element of the elements of the optical system has an aspherical surface.

An aspherical surface is understood to be a surface whose fundamental shape is regular, i.e. in connection with the present invention parabolic, cylindrical or toroidal, but whose actual shape has small deviations for correcting aberrations in the radiation beam wavefront modified by the fundamental shape.

By rendering one or more of the beam-shaping surfaces aspherical in the measuring device according to the invention, the quality of the scanning beam may be enhanced without extra correction elements being necessary.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
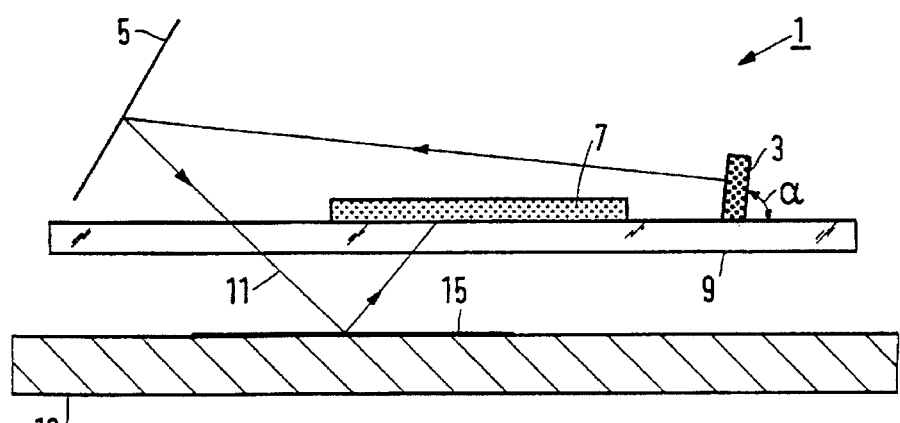
FIG. 1 is a diagrammatic cross-section of an embodiment of the measuring device according to the invention.

The measuring device 1 shown diagrammatically in FIG. 1 comprises a radiation source 3, a reflecting, collimating element 5 and a detector 7. The radiation source 3 and the detector 7 may be mounted, for example, on an optically transparent plate 9. The radiation emitted by the radiation source 3 is incident on the element 5 which reflects the radiation as a collimated beam 11 towards a graduation element 13. The graduation element 13 is mechanically connected to the object (not shown) whose displacement is to be determined. The graduation element 13 may be, for example, a steel tape on which a track 15 is provided in the form of a grating comprising a plurality of grating-shaped strips 16 (FIG. 2), for example, a gold grating, which strips 16 are juxtaposed in the direction perpendicular to the plane of the drawing of FIG. 1. This direction is also the direction of movement of the object.

The detector may be, for example, a multiple photosensitive cell detector as described in said United States Patent, on which detector the track is imaged 1:1. In this way a given grating strip within the radiation beam is imaged on a given portion of the detector for a given position of the graduation element 13 with respect to the detector 7. It is then important that the radiation beam upon incidence on the graduation element is parallel on average in the cross-section perpendicular to the direction in which the grating strips extend. The beam from the element 5 can be considered as a plurality of successive sub-beams in the direction perpendicular to the plane of the drawing, each illuminating a grating strip. If the radiation beam is not parallel in the relevant direction, the quality of the read signal will be dependent on the distance between the graduation element 13 and the detector 7. If there is a difference from the nominal distance, read errors will be produced. If the sub-beams are not parallel to each other, each sub-beam will image the corresponding grating strip at a different angle on the detector so that, in the assumed position, not every grating strip is exactly imaged on the associated photosensitive cell. The result is that read errors will occur. However, parallelism of the radiation beam in the plane of the drawing is not required. Practice has proved that for, for example, a distance of approximately 1 mm between the track and the detector and the requirement that the maximum deviation of the measuring device is 1 µm, the deviation from the mutual parallel position of the chief rays between the track and the detector should be no more than 0.04°. In the direction parallel to the direction of movement of the object, the beam has such a dimension that a plurality of grating strips is simultaneously scanned on the graduation element and imaged on the detector. In this way irregularities in the grating will be averaged out. The collimated radiation beam 11 is reflected on the graduation element towards the detector 7.

Instead of being formed with the reflection grating described above, the graduation element 13 may alternatively be formed with a transmission grating. In that case the graduation element 13 consists of, for example, a glass ruler which is provided on a steel tape as a support and on which the track 15 is provided in the form of a grating on the surface facing the measuring device. The parallel radiation beam 11 which is incident on the graduation element passes through the ruler, is reflected on the steel tape and goes towards the detector via the track. In this way the grating is imaged in transmission on the detector.

In principle, the radiation source 3 may be a semiconductor laser or a light-emitting diode (LED). A semiconductor laser has the advantage that the radiation is supplied in the form of a radiation beam having a relatively small divergence. It is sufficient to orient the laser at a given angle α so that sufficient radiation reaches the desired area on the collimating element, as is shown diagrammatically in FIG. 1. However, a semiconductor laser has the drawback of a relatively limited lifetime, so that a LED is preferably used. Moreover, a LED has the advantage of being a relatively inexpensive radiation source. However, a LED has the drawback of a smaller usable light output because a LED emits radiation in all directions. To guide as much radiation as possible to the graduation element 13 and subsequently to the detector 7, a collimating element having a large numerical aperture can be used. However, for a large numerical aperture it is more difficult to realize the parallelism of the beam in the cross-section perpendicular to the direction of the grating strips 15. By lack of parallelism in the cross-section perpendicular to the direction of the grating strips, read errors will be introduced. In accordance with a further aspect of the present invention it is therefore proposed to adapt the optical system in such a way that a relatively high light output can also be obtained with a LED without an increase of the electric current through the LED being necessary.

Figure 2:
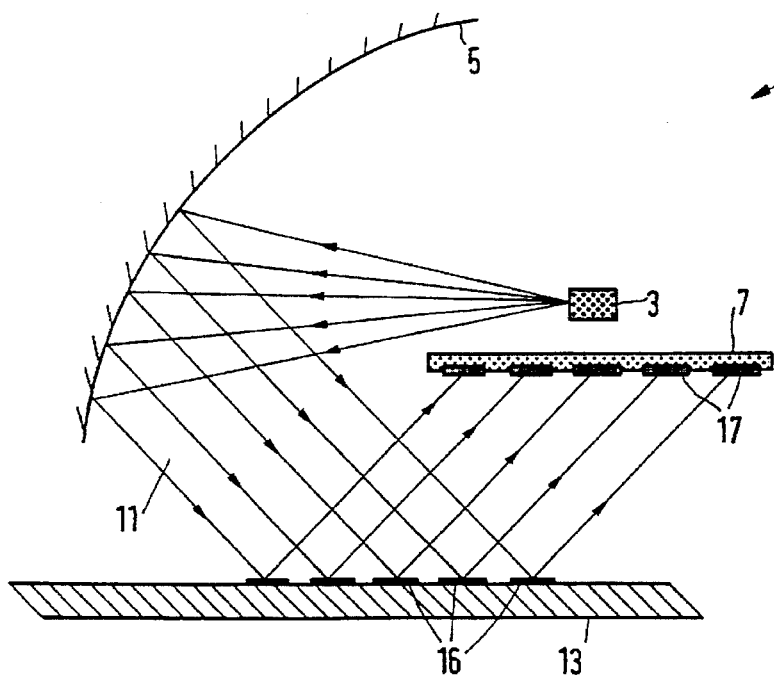
FIG. 2 shows in detail the radiation path between the radiation source, the collimating element in the form of an off-axis paraboloid, the graduation element and the detector for a measuring device according to the invention.

An eminently suitable reflecting, collimating element for use in the present invention is a rotationally symmetrical rotational paraboloid whose rotational axis is parallel to the direction of the radiation beam which is parallel on average and in which the radiation source 3 is present in the focus of the paraboloid. In order to guide the parallel radiation beam 11 towards the graduation element 13 without partially reflecting beam-splitting elements which may obstruct the light path, the element 5 is preferably implemented as an off-axis portion of a rotationally symmetrical rotational paraboloid. FIG. 2 shows the light path between the radiation source 3 and the detector 7 of a measuring device including such a collimating element 5. In the position show of the element 13, a grating strip 16 of the track 15 is imaged on one photosensitive cell 17 of the detector 7. In practice more photosensitive cells may be used.

It is an object of the present invention to provide a compact measuring device. Such a measuring device occupies a relatively small space on the measuring slide of the apparatus in which it is used. Moreover, when the measuring device is compact, the dynamic behaviour of the total slide is not impeded by the dimensions of the measuring device.

To be able to distinguish the separate grating strips 16 in the image of the track 15 on the detector 7, a minimum optical path length between the track 15 and the detector 7 is required. The provision of the collimating element 5 in the light path between the radiation source 3 and the track 15 implies that this minimum optical path length should extend from the radiation source 3 to the collimating element 5.

In accordance with a further aspect of the invention a further reflecting element provides the possibility of realizing said optical path length with a shorter geometrical distance between the radiation source and the collimating element and consequently the measuring device may be made more compact.

Figure 3:
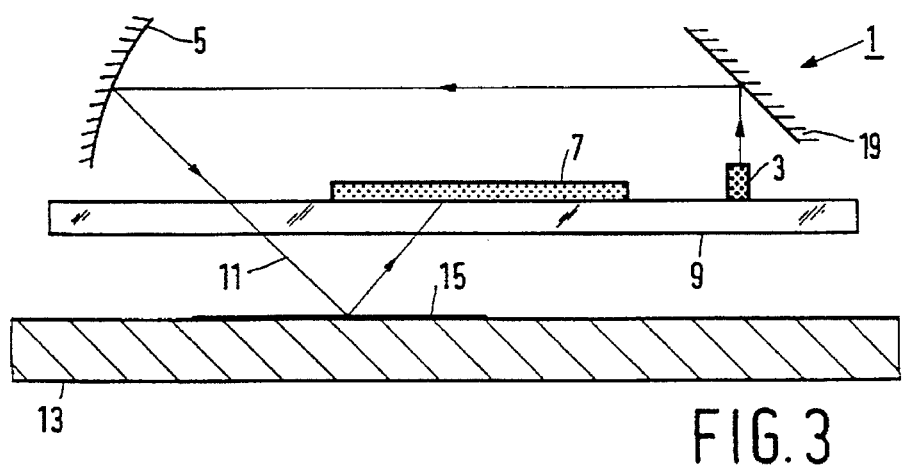
FIG. 3 is a diagrammatic cross-section of a compact embodiment of the measuring device according to the invention.

It is possible to arrange one or more flat folding mirrors between the radiation source and the off-axis parabolic mirror 5. Consequently, the light path is further folded and the measuring device 1 can be given a considerably more compact form. An embodiment using one folding mirror 19 is shown in FIG. 3. For the sake of simplicity, the beam is represented by its chief ray, similarly as in FIG. 1.

The paraboloid may be aspherical. This means that the shape will have small deviations with respect to the regular fundamental shape. In this way aberrations caused in the radiation beam wavefront modified by the fundamental shape can be corrected.

The above-mentioned embodiments in which the collimating element 5 is an off-axis portion of a rotationally symmetrical rotational paraboloid has the advantage that it can be realized in a relatively simple manner.

Figure 4:
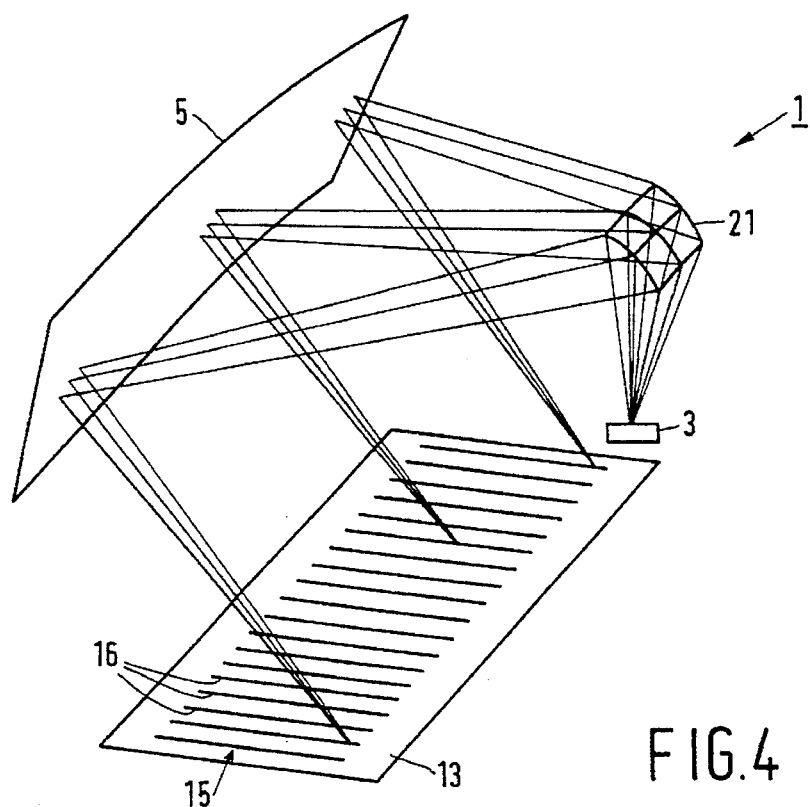
FIG. 4 is a diagrammatic perspective view of an embodiment according to the invention, with an elliptically cylindrical mirror and a parabolically cylindrical mirror.

An embodiment of the measuring device according to the invention in which, however, the light output can be increased by a factor of five and in which also the distance between the radiation source 3 and the collimating element 5 is reduced is shown in a perspective view in FIG. 4. For the sake of simplicity the detector is not shown in this Figure. This detector is located to the right of the graduation element 13, for example, in the plane of the radiation source 3. In this embodiment a reflecting element 21 is arranged between the radiation source 3 and the collimating element 5, which reflecting element 21 is an elliptically cylindrical mirror. The cylindrical axis of this cylindrical mirror is perpendicular to the direction of the grating strips and the cross-section in the plane parallel to the direction of the grating strips is elliptic. In this way the numerical aperture in the direction of the grating strips of the graduation element 13 is increased considerably so that the reflecting element 21 plays the role of a collector. Each source point of the LED is imaged by the elliptically cylindrical mirror as a strip in the direction perpendicular to the direction of the grating strips 16. The collimating element 5 is implemented as a parabolically cylindrical mirror whose cylindrical axis is parallel to a plane constituted by a grating strip 15 and the normal on the graduation element 13 and whose cross-section perpendicular to this plane is parabolic. The magnification of the elliptically cylindrical mirror 21 may be chosen to be such that the image of the LED is adapted to the dimension of the detector in the direction perpendicular to the direction of the grating strips. Thus, the radiation emitted by the LED is used to an optimum extent. Also in this embodiment the measuring device may even be more compact by arranging a flat folding mirror (not shown) in the light path between the radiation source 3 and the graduation element 13, for example, between the collecting element 21 and the collimating element 5.

An important consideration in the measuring device described above is possible contamination. Particularly when the measuring device is used for measurements on workpieces made on machines such as lathes, it is important that the measuring results remain reliable in spite of a certain degree of contamination. In fact, such a contamination may cause a partial asymmetrical coverage of the track 15 on the graduation element 13 and/or the detector 7 so that a part of the detector 7 or the track 15 will be unusable and the signal will be distorted. For this reason the requirement of parallelism of the radiation beam 11 is relatively stringent. When the full surface area of the detector is usable, the numerical aperture of the collecting element in the direction parallel to the grating strips may still be relatively large, whereas the read error could increase to several µm if, for example, 85% of the detector were contaminated. At a relatively large numerical aperture in the cross-section parallel to the grating strips, the parallelism at the ends of the elongate radiation beam decreases. Consequently, a numerical aperture reduction of the collecting element in the direction of the grating strips will contribute to the parallelism of the radiation beam 11 and hence to the accuracy of the measuring device. However, this is at the expense of the light output.

In the embodiment using the off-axis parabolic mirror, such a contamination is less troublesome to the accuracy because the small numerical aperture will lead to fewer aberrations and hence to a smaller deviation from parallelism. However, the light output is a factor of five lower, though sufficient for many applications.

In the embodiment using an elliptically and a parabolically cylindrical mirror, a diaphragm is preferably arranged, with which the numerical aperture of the elliptically cylindrical mirror in the direction of the grating strips of the graduation element can be limited, if necessary. A larger numerical aperture yields a higher light output at the expense of the parallelism of the radiation beam, which choice will be preferred if there is little or no contamination of the track or the detector. A smaller numerical aperture will yield a radiation beam whose portions at a larger distance from the beam axis are still sufficiently parallel, but this will be at the expense of the light output. The diaphragm will be particularly applicable when the measuring device is used in an environment producing much contamination.

By rendering at least the parabolically cylindrical mirror aspherical, the parallelism of the radiation beam at the ends can be improved so that the collecting element may have a larger numerical aperture than for the regular fundamental shape and thus a higher light output can be obtained.

If a higher light output is desirable for increasing the signal-to-noise ratio, it is possible to arrange two or more LEDs for illuminating the same track, one behind the other in the direction parallel to the direction of the grating strips on the graduation element. Another possibility of increasing the signal-to-noise ratio is to render the scanning frequency of the detector or the LED current variable.

Figure 5A:
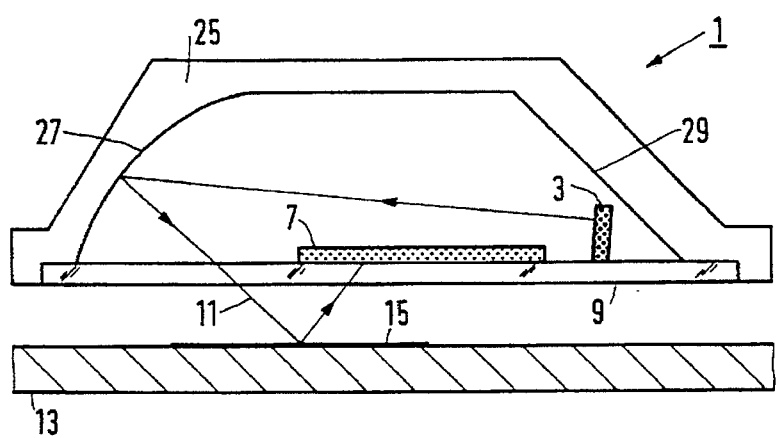
FIGS. 5a and 5b show two embodiments of a measuring device according to the invention in which the radiation source, the detector and the optical system are integrated in the same housing.
Figure 5B:
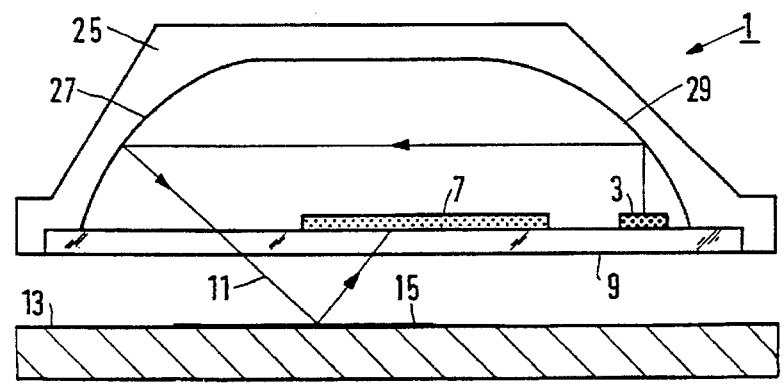

A further optimization of the measuring device according to the invention is to accommodate the radiation source 3 and the detector 2 in a housing 25 with which the full reflecting optical system is integrated. Such a housing may be made, for example, by means of injection moulding and during the same process it may be provided with windows 27, 29 having the geometry desired for the reflecting elements. By providing a layer of reflecting material on these windows, the desired optical reflective components are subsequently obtained. The optically transparent plate 9 may then be used as a bottom and cover plate for the housing 25. FIGS. 5a and 5b show some embodiments of a measuring device in which the optical system is integrated with the housing which also accommodates the detector 7 and the radiation source 3.

FIG. 5a shows the embodiment in accordance with the diagram of FIG. 1 in which the radiation from the radiation source is directly incident on the collimating element 5. The collimating element 5 is now integrated with the window 27 of the housing 25. FIG. 5b shows the embodiment in accordance with the diagram of FIG. 4 in which the collimating element is a parabolically cylindrical mirror and is integrated with the window 27 and in which a collecting element is added in the form of an elliptically cylindrical mirror and is integrated with the window 29. A possible flat folding mirror for shortening the light path between the radiation source and the graduation element may be integrated with a window provided in one of the other walls of the housing.

If the optical system, the radiation source and the detector are integrated in the same housing, an optimum can be achieved between read errors and light output in the embodiment using the elliptically and parabolically cylindrical mirrors by providing the housing 25 with an inner housing (not shown) which is provided with a diaphragm with which the numerical aperture of the elliptically cylindrical mirror can be reduced in the direction of the grating strips. Unwanted stray light may also be captured by means of such an inner housing.

As described in U.S. Pat. No. 3,973,119, the multiple photosensitive cell detector may be used as a reference grating by way of a special drive of the photosensitive cells. To calibrate the measuring device, a second track in addition to the incremental track 15 may be provided as a calibration track on the graduation element. Both tracks can then be imaged on the detector by means of a separate radiation beam emitted or not emitted by the same radiation source. Subsequently the measurements originating from the two tracks can be compared by means of a processing unit.

The measuring device described above may be made suitable for absolute measurements by implementing the second, absolute track as a pseudo-random track or by marking one or more pitches of the incremental track. An absolute measuring device in which a pseudo-random track is used as an absolute track is described in European Patent Application EP 0 503 716 A1. In the absolute measuring device described in this Application the incremental track comprises grating strips and the width of two successive strips determines the pitch. The absolute track is preferably located as close as possible next to the incremental track on the graduation element and has, for example, the same optical pitch. Both tracks can be illuminated by means of the same combination of radiation source and optical system by making use of a beam splitter which distributes the radiation beam on the two tracks or by ensuring that the elongate radiation beam is wide enough to illuminate the two tracks at a time. It is alternatively possible into use a separate measuring device for each track. A further possibility is to combine the incremental track and the absolute track to a single composite track as described in said European Patent Application. In that case it is sufficient to use a single measuring device, possibly a measuring device whose radiation source, detector and optical system are integrated in the same housing.

In the device according to the invention the main elements fixing the radiation path and its length are reflective elements. These elements may be supplemented with refractive elements for performing corrections.

Figure 6:
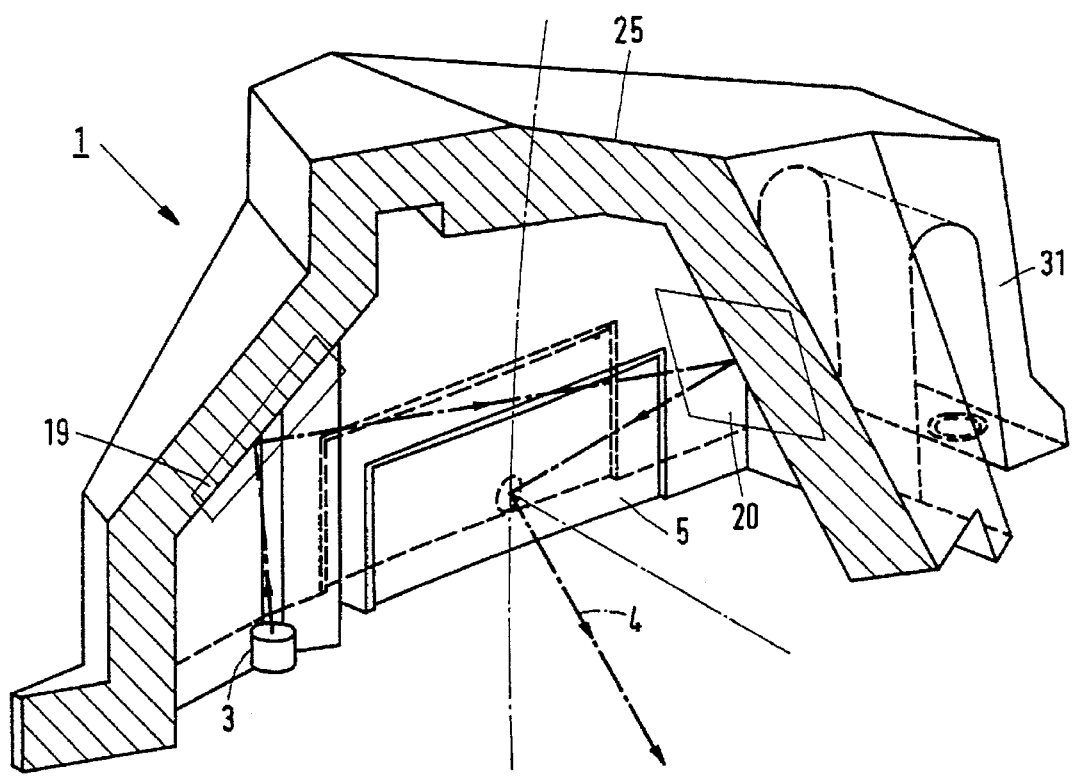
FIG. 6 is a perspective cross-sectional view of a practical embodiment of the measuring device according to the invention.

FIG. 6 shows a practical embodiment of the measuring device 1. The radiation from the radiation source 3 is incident along the optical axis 4 on a first flat folding mirror 19 on which the radiation is reflected towards a second flat folding mirror 20 which further reflects the radiation towards the collimating element 5. The element 5 has the shape of an off-axis portion of a rotationally symmetrical rotational paraboloid. The beam collimated thereby will subsequently be reflected on the graduation element (not shown). Both flat folding mirrors 19, 20 and the parabolic mirror are integrated with the housing 25. The housing 25 is further provided with a resilient element 31. Since the housing is preferably made by means of injection moulding, the material of the housing will be sensitive to thermal expansion. By providing the housing with the resilient element 31, the radiation beam collimated by element 5 will maintain such a position that errors due to thermal expansion are prevented during reading. Due to the integration of the optical system and the resilient element 31 in the same housing 25 for the purpose of compensating expansion, a mechanically and optically stable measuring device is obtained.

We claim:

1. A measuring device for determining the displacement of a movable object in cooperation with a graduation element connected to the object and having at least a track which is formed from a plurality of successive grating strips extending transversely to the direction of movement of the object, said measuring device comprising:
   at least a radiation source for generating radiation and an associated reflective optical system which comprises at least a collimating element for converting the radiation into a radiation beam which is parallel on average and for guiding said parallel radiation beam along a path towards the graduation element, and a radiation-sensitive detection system for converting radiation from the graduation element into an electric signal, wherein the radiation source is located outside of the path between the reflective optical system and the graduation element.

2. A measuring device as claimed in claim 1, wherein the optical system further comprises at least a flat folding mirror in the path of the radiation beam.

3. A measuring device as claimed in claim 1 wherein the radiation source and the detection system are present in a housing and the elements of the reflective optical system are incorporated in the walls of the housing.

4. A measuring device as claimed in claim 1 wherein the collimating element comprises only an off-axis portion of a parabolic mirror, and the reflective optical system further comprises an elliptically cylindrical mirror positioned between said radiation source and the parabolic mirror and having a cylindrical axis perpendicular to the grating strips and an elliptic cross-section in a plane parallel to the grating strips.

5. A measuring device as claimed in claim 1 wherein the collimating element comprises a parabolicly cylindrical mirror and the reflective optical system further comprises an elliptically cylindrical mirror in the path of the radiation beam before it reaches the radiation-sensitive detection system.

6. A measuring device as claimed in claim 1 wherein the reflective optical system further comprises a flat folding mirror positioned between the radiation source and the collimating element.

7. A measuring device as claimed in claim 6 wherein at least the collimating element has an aspherical surface.

8. A measuring device as claimed in claim 1 wherein the radiation source is located entirely outside of the path between the reflective optical system and the graduation element and generates a light beam, and the radiation-sensitive detection system comprises a multiplicity of photosensitive cells.

9. A measuring device as claimed in claim 8 wherein the graduation element comprises a reflective grating and, in a direction parallel to the direction of movement of the object, the radiation beam simultaneously scans a plurality of grating strips on the graduation element and, via a reflected radiation beam, images said grating strips on a plurality of said photosensitive cells.

10. A measuring device for determining the displacement of a movable object in cooperation with a graduation element connected to the object and having at least a track which is formed from a plurality of successive grating strips extending transversely to the direction of movement of the object, said measuring device comprising:

at least a radiation source for generating radiation and an associated optical system for converting the radiation into a radiation beam which is parallel on average and for guiding said radiation beam towards the graduation element, and a radiation-sensitive detection system for converting radiation from the graduation element into an electric signal, wherein the optical system is a reflective optical system and comprises a collimating element comprising an off-axis portion of a rotationally symmetrical rotational paraboloid, with the radiation source arranged at its focus.

11. A measuring device as claimed in claim 10, wherein the optical system further comprises at least a flat folding mirror in a path of the radiation and before the radiation reaches the collimating element.

12. A measuring device as claimed in claim 10, wherein the radiation source and the detection system are present in a housing and the elements of the reflective optical system are incorporated in the walls of the housing.

13. A measuring device as claimed in claim 10 wherein at least the collimating element of the optical system has an aspherical surface and the collimating element includes only the off-axis portion of the paraboloid.

14. A measuring device for determining the displacement of a movable object in cooperation with a graduation element connected to the object and having at least a track which is formed from a plurality of successive grating strips extending transversely to the direction of movement of the object, said measuring device comprising at least a radiation source for generating radiation and an associated optical system for converting the radiation into a radiation beam which is parallel on average and for guiding said radiation beam towards the graduation element, and a radiation-sensitive detection system for converting radiation from the graduation element into an electric signal, wherein the optical system is a reflective optical system and comprises a collimating element comprising a parabolically cylindrical mirror whose cylindrical axis is parallel to a plane constituted by a grating strip and the normal on the graduation element intersecting the grating strip and whose cross-section perpendicular to said plane is parabolic, and the optical system further comprises, between said mirror and the radiation source, an elliptically cylindrical mirror whose cylindrical axis is perpendicular to the grating strips and whose cross-section in a plane parallel to the grating strips is elliptic.

15. A measuring device for determining the displacement of a movable object in cooperation with a graduation element connected to the object and having at least a track which is formed from a plurality of successive grating strips extending transversely to the direction of movement of the object, said measuring device comprising:

at least a radiation source for generating radiation and an associated reflective optical system which comprises at least a collimating element for converting the radiation into a radiation beam which is parallel on average and for guiding said radiation beam towards the graduation element, and a radiation-sensitive detection system for converting radiation from the graduation element into an electric signal, wherein at least the collimating element of the optical system has an aspherical surface.

16. A measuring device for determining the displacement of a movable object comprising:

a graduation element connected to the object and having at least a track which includes a plurality of successive grating strips extending transversely to the direction of movement of the object, a radiation source for generating radiation and an associated reflective optical system for converting the radiation into a radiation beam which is parallel on average and for guiding said radiation beam towards the graduation element, and a radiation-sensitive detection system for converting radiation from the graduation element into an electric signal, wherein the radiation source, the radiation-sensitive detection system and the reflective optical system are arranged on the same side of the graduation element, and the reflective optical system comprises at least a collimating element.

17. A measuring device as claimed in claim 16 wherein the collimating element comprises an off-axis portion of a parabolic mirror with the radiation source located at its focus.

18. A measuring device as claimed in claim 16 wherein said radiation source, said collimating element and said graduation element are positioned relative to one another so that the parallel radiation beam strikes the grating strips of the graduation element at an acute angle.

19. A measuring device as claimed in claim 16 wherein said detection system is located between the radiation source and the graduation element.

20. A measuring device as claimed in claim 16 wherein the collimating element has an aspherical surface.

* * * * *